United States Patent
Alcantara Marte et al.

(10) Patent No.: US 12,447,685 B2
(45) Date of Patent: Oct. 21, 2025

(54) SYSTEM AND METHOD OF ADDITIVELY MANUFACTURING A COMPONENT WITH MULTIPLE PROCESSING STRATEGIES

(71) Applicant: General Electric Company, Schenectady, NY (US)

(72) Inventors: Eliezer Manuel Alcantara Marte, Liberty Township, OH (US); Stefka Petkova, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 297 days.

(21) Appl. No.: 16/936,814

(22) Filed: Jul. 23, 2020

(65) Prior Publication Data
US 2022/0024135 A1 Jan. 27, 2022

(51) Int. Cl.
*B29C 64/393* (2017.01)
*B22F 10/00* (2021.01)
(Continued)

(52) U.S. Cl.
CPC ............ *B29C 64/393* (2017.08); *B22F 10/00* (2021.01); *B29C 64/153* (2017.08); *B33Y 10/00* (2014.12);
(Continued)

(58) Field of Classification Search
CPC ......... B33Y 30/00; B33Y 50/00; B33Y 50/02; B33Y 50/002; B33Y 10/00; B29C 64/20;
(Continued)

(56) References Cited

U.S. PATENT DOCUMENTS 1,708,022 A 4/1929 Lorenz
2,245,075 A 6/1941 Mingle
(Continued)

FOREIGN PATENT DOCUMENTS

CN 108602279 A 9/2018
CN 110545942 A 12/2019
(Continued)

OTHER PUBLICATIONS

ASM Handbook, vol. 24, Additive Manufacturing Processes, D. Bourell, W. Frazier, H. Kuhn, M. Seifi, editors, DOI 10.31399/asm.hb.v24.a0006548 (Year: 2020).*
(Continued)

*Primary Examiner* — Susan D Leong
*Assistant Examiner* — Jennifer L Groux
(74) *Attorney, Agent, or Firm* — Dinsmore & Shohl LLP

(57) ABSTRACT

Systems, methods, and non-transitory computer-readable medium are provided that enable a component to be additively manufactured in a single build with multiple processing strategies. In one example aspect, a model representing a component is decomposed into submodels that each correspond to a subcomponent of the component. Each of the subcomponents can have a preselected metric associated therewith. The model can be decomposed into the submodels based at least in part on the preselected metrics. A set of build parameters is selected or assigned to each of the submodels based at least in part on the preselected metrics associated with the subcomponents. Overlap regions can be defined at each interface between adjacent subcomponents. The build parameters selected for adjacent subcomponents can be used to blend the build parameters for the defined overlap regions. The submodels and the blended build parameters can be used to additively manufacture the component.

8 Claims, 11 Drawing Sheets

(51) Int. Cl.
*B29C 64/153* (2017.01)
*B33Y 10/00* (2015.01)
*B33Y 30/00* (2015.01)
*B33Y 50/02* (2015.01)
*B22F 10/10* (2021.01)

(52) U.S. Cl.
CPC .............. *B33Y 30/00* (2014.12); *B33Y 50/02* (2014.12); *B22F 10/10* (2021.01)

(58) Field of Classification Search
CPC ..... B29C 64/386; B29C 64/393; G06F 30/20; G06F 2113/10; G05B 19/4099
See application file for complete search history.

(56) References Cited

U.S. PATENT DOCUMENTS

| | | | |
|---|---|---|---|
| 2,593,416 | A | 4/1952 | Dawson |
| 3,416,307 | A | 12/1968 | Wallis |
| 3,943,780 | A | 3/1976 | Klaue |
| 7,833,126 | B2 | 11/2010 | Venter |
| 8,509,933 | B2 | 8/2013 | Steingart et al. |
| 8,720,306 | B2 | 5/2014 | McCune et al. |
| 9,245,061 | B2 | 1/2016 | Schouwenburg |
| 9,250,873 | B2 | 2/2016 | Fischer et al. |
| 9,870,440 | B2 | 1/2018 | Kalte et al. |
| 10,078,325 | B2 | 9/2018 | Gunnarsson et al. |
| 10,357,828 | B2 | 7/2019 | Fieldman et al. |
| 10,391,753 | B2 | 8/2019 | Fieldman et al. |
| 10,471,695 | B2 | 11/2019 | Gold et al. |
| 10,486,362 | B2 | 11/2019 | Alcantara Marte et al. |
| 10,549,478 | B2 | 2/2020 | Alcantara Marte et al. |
| 10,556,383 | B2 | 2/2020 | Stevenson et al. |
| 10,583,606 | B2 | 3/2020 | Joerger et al. |
| 2003/0164567 | A1 | 9/2003 | Coe |
| 2014/0074274 | A1 | 3/2014 | Douglas et al. |
| 2016/0096318 | A1* | 4/2016 | Bickel .................... B33Y 30/00 425/150 |
| 2017/0232512 | A1 | 8/2017 | Joerger |
| 2017/0232515 | A1 | 8/2017 | DeMuth et al. |
| 2017/0232671 | A1 | 8/2017 | Fieldman |
| 2018/0029306 | A1 | 2/2018 | Gold et al. |
| 2018/0073437 | A1 | 3/2018 | Simonetti et al. |
| 2018/0221958 | A1 | 8/2018 | Torun et al. |
| 2018/0268091 | A1* | 9/2018 | Arisoy .................... B33Y 50/00 |
| 2018/0276316 | A1* | 9/2018 | Brochu .................... G06F 30/23 |
| 2018/0318922 | A1 | 11/2018 | Valls Angles |
| 2018/0328289 | A1 | 11/2018 | Madge |
| 2018/0330029 | A1 | 11/2018 | Pedersen et al. |
| 2018/0348736 | A1* | 12/2018 | Sharon .................... B22F 10/00 |
| 2019/0039368 | A1* | 2/2019 | Zeng .................... B29C 64/386 |
| 2019/0054567 | A1* | 2/2019 | Roerig .................... B33Y 10/00 |
| 2019/0337283 | A1 | 11/2019 | Fieldman et al. |
| 2020/0164437 | A1* | 5/2020 | Göth .................... B22F 10/36 |
| 2020/0324482 | A1* | 10/2020 | Taig .................... G06T 17/00 |
| 2020/0406553 | A1* | 12/2020 | Lebron .................... G06T 19/00 |
| 2021/0260829 | A1* | 8/2021 | Hosseini Rankouhi .................... B22F 10/38 |

FOREIGN PATENT DOCUMENTS

| | | | | |
|---|---|---|---|---|
| CN | 111347671 | A | | 6/2020 |
| EP | 3566856 | A1 * | 11/2019 | .............. B22F 10/20 |
| EP | 3650143 | A1 | | 5/2020 |
| JP | 2002001827 | A | | 1/2002 |
| JP | 2015120340 | A | | 7/2015 |
| JP | 2019081358 | A | | 5/2019 |
| WO | WO-2019013738 | A1 * | 1/2019 | ........... B29C 64/386 |
| WO | WO-2019209326 | A1 * | 10/2019 | ........... B29C 64/118 |
| WO | WO-2020096727 | A1 * | 5/2020 | .............. B29C 64/10 |

OTHER PUBLICATIONS

Marc Saunders, "How process parameters drive successful metal AM part production," originally published in Metal AM vol. 4 No. 2, 2018 (Year: 2018).*

Anonymous and Others: "Can You Change the Infill Settings for Different Parts of a Model?", Jul. 2, 2019 (Jul. 2, 2019), XP055858754, Retrieved [on Dec. 7, 2021] from the Internet: URL:https://forum.prusaprinters.org/forum/original-prusa-i3-mk3s-mk3-how-do-i-print-this-printing-help/can-you-change-the-infill-settings-for-different-parts-of-a-model/.

Anonymous: "Slic3r Manual—Print Settings", Jun. 18, 2020 (Jun. 18, 2020), XP055858757, Retrieved [on Dec. 7, 2021] from the Internet: URL:https://web.archive.org/web/20200618032358/https:// manual.slic3r.org/expert-mode/print-settings.

Anonymous and Others: "Cura: Support structure speed—Ultimaker Cura-Ultimaker Community of 3D Printing Experts", Ultimaker Community, Mar. 12, 2016 (Mar. 12, 2016), XP055858724, Retrieved [on Dec. 7, 2021] from the Internet: URL:https://community.ultimaker.com/topic/13254-cura-support-structure-speed/.

Makeit: "Two-Material Print with Cura", Dec. 2, 2015 (Dec. 2, 2015), XP055859127, Retrieved from the Internet: URL:https://www.youtube.com/watch?v=5x19CUPCHaA.

Vision Miner: "3D Printing: Support Structures Explained", Jun. 10, 2019 (Jun. 10, 2019), XP055859238, Retrieved from the Internet: URL:https://www.youtube.com/watch?v=9RhAFA21 UCc.

Triangulatica: "How to: Raster multicolor and multimaterial slicing", Feb. 18, 2020 (Feb. 18, 2020), XP055859135, Retrieved from the Internet: URL:https://www.youtube.com/watch?v=zVrc-9C1yhY.

Jun Wu et al: "Self-Supporting Rhombic Infill Structures for Additive Manufacturing", Internet Citation, Jul. 25, 2016 (Jul. 25, 2016), pp. 1-12, XP002794738, Retrieved [ on Oct. 3, 2019] from the Internet:URL:http://homepage.tudelft.nl/z0s1 z/data/pdf/CAD2016-rhombic.pdf.

Extended European Search Report for EP Application No. 21180523.9 dated Nov. 19, 2021 (14 pages).

Japanese office action for application 2021-120735 mail date Jun. 17, 2022 (8 pages with English Translation).

Japanese Patent Office Action for Application No. 2021-120735 dated Jan. 6, 2023 (8 pages).

Chinese Office Action for Application No. 202110828599.8 dated Dec. 31, 2024 (15 pages with English Translation).

* cited by examiner

330

PART IDENTIFIER

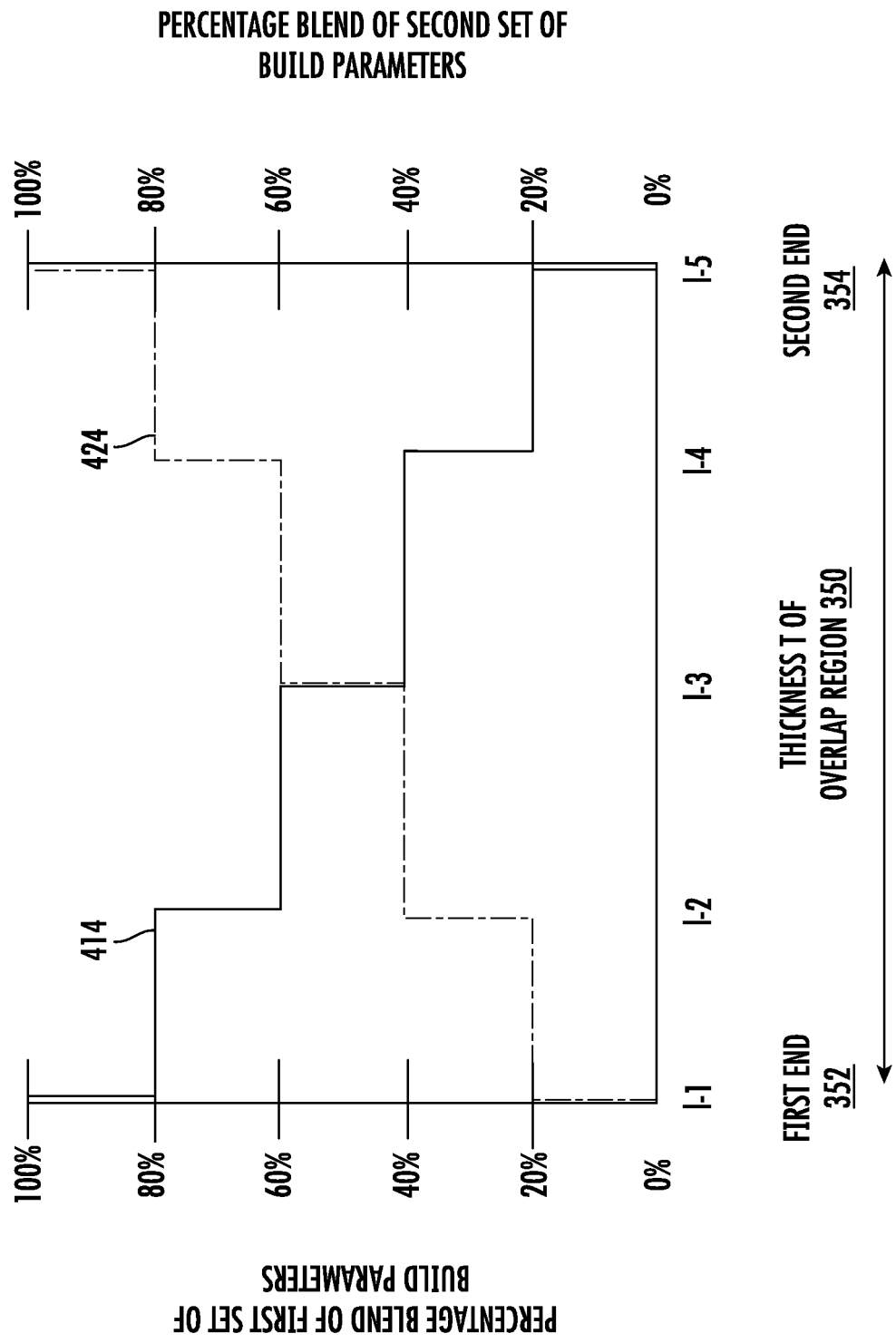

SYSTEM AND METHOD OF ADDITIVELY MANUFACTURING A COMPONENT WITH MULTIPLE PROCESSING STRATEGIES

FIELD

The present subject matter relates generally to additive manufacturing.

BACKGROUND

Traditionally, components have been additively manufactured using a single processing strategy. Stated another way, for a given component, the same processing strategy is used to build up each layer of the component. While a single processing strategy can be used to build up components with relative ease, such single processing strategies can be slow and wasteful regarding material deposition/fusion. Moreover, a particular feature of a component may require a critical-to-quality metric that must be achieved. In such instances, the build parameters set for the single processing strategy would be selected to ensure that the feature meets the quality metric. However, other features of the component may have other metrics or design specifications that may not be achieved with the selected build parameters for the single processing strategy. Accordingly, the design intent or metrics of other features may not be achieved with a single processing strategy.

Therefore, systems and methods that addresses one or more of the challenges above would be useful. Particularly, a system and method operable to implement multiple processing strategies in a single build up of a monolithic component would be beneficial.

BRIEF DESCRIPTION

Aspects and advantages of the invention will be set forth in part in the following description, or may be obvious from the description, or may be learned through practice of the invention.

In one aspect, a method is provided. The method includes decomposing a model representing a component into submodels that each correspond to a subcomponent of the component, each of the subcomponents having a preselected metric associated therewith, the model being decomposed into the submodels based at least in part on the preselected metrics. The method also includes selecting a set of build parameters for each of the submodels based at least in part on the preselected metrics associated with the subcomponents. Further, the method includes additively manufacturing the component in a single build by building up the subcomponents of the component using their respective selected sets of build parameters.

In another aspect, a system is provided. The system includes an additive manufacturing machine. The system also includes one or more processors and one or more memory devices. The one or more memory devices store computer-readable instructions that when executed by the one or more processors cause the one or more processors to perform operations. In performing the operations, the one or more processors are configured to: decompose a model representing a component into submodels that each correspond to a subcomponent of the component, each of the subcomponents having a preselected metric associated therewith, the model being decomposed into the submodels based at least in part on the preselected metrics; select a set of build parameters for each of the submodels based at least in part on the preselected metrics associated with the subcomponents; and cause the additive manufacturing machine to additively manufacture the component in a single build by building up the subcomponents of the component using their respective selected sets of build parameters.

In yet another aspect, a non-transitory computer-readable medium is provided. The non-transitory computer-readable medium comprises computer-executable instructions, which, when executed by one or more processors of a controller, cause the controller to: decompose a model representing a component into submodels that each correspond to a subcomponent of the component, each of the subcomponents having a preselected metric associated therewith, the model being decomposed into the submodels based at least in part on the preselected metrics; select a set of build parameters for each of the submodels based at least in part on the preselected metrics associated with the subcomponents; and cause an additive manufacturing machine to additively manufacture the component in a single build using the selected sets of build parameters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 13 provides a graph depicting a manner in which two sets of build parameters can be blended to form a set of blended parameters according to one example embodiment of the present subject matter.

DETAILED DESCRIPTION

Figure 1:
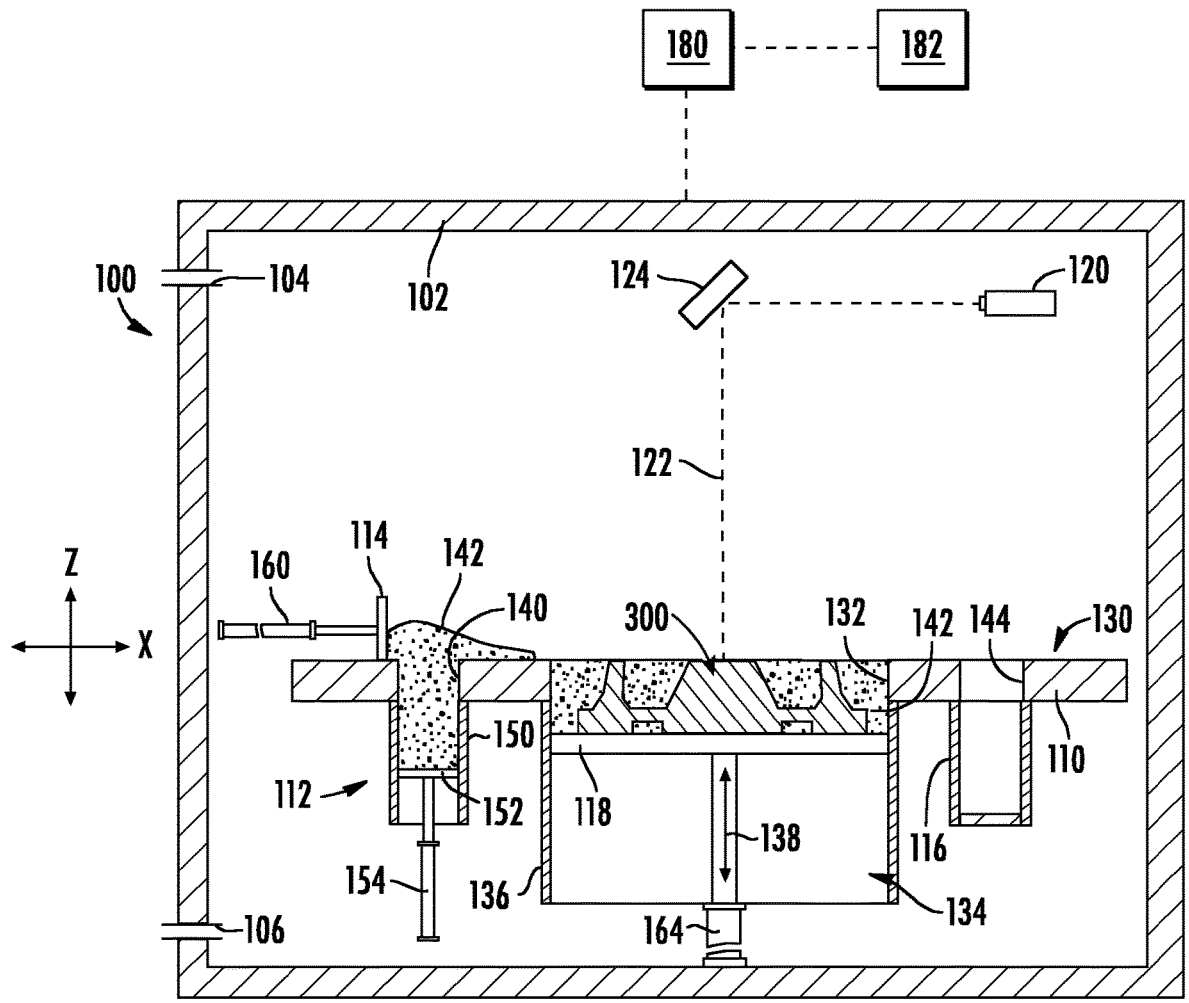
FIG. 1 provides a schematic view of an additive manufacturing machine according to one example embodiment of the present subject matter.

Reference will now be made in detail to present embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of any claims and their equivalents.

The detailed description uses numerical and letter designations to refer to features in the drawings. Like or similar designations in the drawings and description have been used to refer to like or similar parts of the invention, and identical numerals indicate the same elements throughout the drawings. As used herein, the terms "first", "second", and "third" may be used interchangeably to distinguish one component from another and are not intended to signify location or relative importance of the individual components.

Aspects of the present disclosure are directed to systems, methods, and non-transitory computer-readable medium that enable a component to be additively manufactured in a single build with multiple processing strategies. In one example aspect, a model representing a component is decomposed or deconstructed into submodels that each correspond to a subcomponent of the component. The model can be a 3D CAD model, for example. The component can be a monolithic component to be additively manufactured and the subcomponents can be defined as certain portions of the component. Each of the subcomponents can have a preselected metric associated therewith. For example, the preselected metric can be a quality metric that, when the component is built up via an additive machine, must be met. The preselected metric can be a strength metric, durability metric, weight metric, surface finish metric, resolution metric, etc. The model can be decomposed into the submodels based at least in part on the preselected metrics, based at least in part on an intended function of a subcomponent, and/or based at least in part on a build speed customization directive.

A set of build parameters is selected or assigned to each of the submodels based at least in part on the preselected metrics associated with the subcomponents. Example build parameters include an energy source power, a scan velocity, and a beam focal spot size setting. Further, for a hybrid additive machine, an energy source type can be selected. The build parameters can be automatically selected for each of the submodels based on the geometry and on how closely the preselected metric matches a predefined metric of a datastore. An operator may also manually set or change selected build parameters as necessary.

With the build parameters set for each of the subcomponents, overlap regions can be defined at each interface between adjacent subcomponents. The build parameters selected for adjacent subcomponents can be used to blend the parameters so that the subcomponents are properly fused together in the built component despite their different build parameters. The submodels and the blended build parameters can be compiled into a consolidated model. The component can then be additively manufactured based at least in part on the consolidated model. Particularly, the component can be additively manufacturing in a single build by building up the subcomponents of the component using their respective selected sets of build parameters. Further, the component can be additively manufacturing in a single build by building up the overlap regions between interfacing subcomponents using the sets of blended build parameters. Applying different build parameters to different subcomponents and overlap regions of the same component facilitates optimization and meeting the design of each subcomponent of a given component.

In general, the components described herein may be manufactured or formed using an additive-manufacturing process, such as a 3D printing process. The use of such a process may allow the components to be formed integrally, as a single monolithic component. In particular, the manufacturing process may allow these components to be integrally formed and include a variety of features not possible when using prior manufacturing methods. For example, the additive manufacturing methods described herein enable the manufacture of components having various features, configurations, thicknesses, materials, densities, surface variations, and identifying features not possible using prior manufacturing methods.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component having a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, but are not limited to, Fused Deposition Modeling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent, for example, a photo-curable polymer or another liquid bonding agent, onto each layer of powder. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed by fusing material, e.g., by polymerizing a plastic using laser energy or heat or by sintering or melting metal powder. For example, a particular type of additive manufacturing process may use an energy beam, like an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

Notably, in exemplary embodiments, several aspects and features of the present subject matter were previously not possible due to manufacturing restraints. However, the present inventors have advantageously utilized current advances in additive manufacturing techniques to improve various components and the method of additively manufacturing such components. While the present disclosure is not limited to the use of additive manufacturing to form these components generally, additive manufacturing does provide a variety of manufacturing advantages, including ease of manufacturing, reduced cost, greater accuracy, etc.

Also, the additive manufacturing methods described above enable much more complex and intricate shapes and contours of the components described herein to be formed with a very high level of precision. For example, such components may include thin additively manufactured layers, cross-sectional features, and component contours. In addition, the additive manufacturing process enables the manufacture of a single component having different materials such that different portions of the component may exhibit different performance characteristics. The successive, additive nature of the manufacturing process enables the construction of these novel features. As a result, components formed using the methods described herein may exhibit improved performance and reliability.

FIG. 1 provides a schematic view of an additive manufacturing system 100 (or AM system 100) according to an example embodiment of the present disclosure. The AM system 100 depicted in FIG. 1 is a laser powder bed fusion additive manufacturing machine or system, such as a DMLS or DMLM system. The AM system 100 is described herein as being used to build all or a portion of one or more components. It should be appreciated that the components described herein are only exemplary components to be built and are used primarily to facilitate description of the operation of AM system 100. The present subject matter is not intended to be limited in this regard to the formation of the components as described, but instead AM system 100 may be used for printing any suitable number, type, and configuration of components or features of components, such as component 300.

As illustrated, the AM system 100 generally defines a vertical direction V or Z-direction, a lateral direction L or X-direction, and a transverse direction T or Y-direction (not shown in FIG. 1), each of which is mutually perpendicular, such that an orthogonal coordinate system is defined. As illustrated, the AM system 100 includes a fixed enclosure 102 or build area that provides a contaminant-free and controlled environment for performing an additive manufacturing process. The enclosure 102 serves to isolate and protect the components of the AM system 100. In addition, enclosure 102 may be provided with a flow of an appropriate shielding gas, such as nitrogen, argon, or another suitable gas or gas mixture. In this regard, enclosure 102 may define a gas inlet port 104 and a gas outlet port 106 for receiving a flow of gas to create a static pressurized volume or a dynamic flow of gas.

The enclosure 102 can contain some or all components of the AM system 100. For this embodiment, the AM system 100 includes a table 110, a powder supply 112, a scraper or recoater mechanism 114, an overflow container or reservoir 116, and a build platform 118 positioned within the enclosure 102. In addition, an energy source 120 generates an energy beam 122 and a beam steering apparatus 124 directs energy beam 122 to facilitate the AM process as described in more detail below.

The table 110 is a rigid structure defining a planar build surface 130. In addition, the planar build surface 130 defines a build opening 132 through which the build chamber 134 may be accessed. More specifically, according to the illustrated embodiment, the build chamber 134 is defined at least in part by vertical walls 136 and the build platform 118. Notably, the build platform 118 is movable along a build direction 138 relative to build surface 130. More specifically, build direction 138 may correspond to the vertical direction V, such that moving the build platform 118 down increases the height of the part being printed and the build chamber 134. In addition, the build surface 130 defines a supply opening 140 through which additive powder 142 may be supplied from powder supply 112 and a reservoir opening 144 through which excess additive powder 142 may pass into the overflow reservoir 116. Collected additive powders may optionally be treated to sieve out loose, agglomerated particles before re-use.

Powder supply 112 generally includes an additive powder supply container 150 that generally contains a volume of additive powder 142 sufficient for some or all of the additive manufacturing process for a specific part or parts. In addition, powder supply 112 includes a supply platform 152, which is a plate-like structure that is movable along the vertical direction within powder supply container 150. More specifically, a supply actuator 154 vertically supports supply platform 152 and selectively moves it up and down during the additive manufacturing process.

The AM system 100 further includes recoater mechanism 114, which is a rigid, laterally-elongated structure that lies proximate build surface 130. The recoater mechanism 114 may be a hard scraper, a soft squeegee, or a roller, for example. The recoater mechanism 114 is operably coupled to a recoater actuator 160 that is operable to selectively move recoater mechanism 114 along build surface 130. In addition, a platform actuator 164 is operably coupled to build platform 118 and is generally operable for moving build platform 118 along the vertical direction during the build process. Although actuators 154, 160, and 164 are illustrated as being hydraulic actuators, it should be appreciated that any other type and configuration of actuators may be used according to alternative embodiments, such as pneumatic actuators, hydraulic actuators, ball screw linear electric actuators, or any other suitable vertical support means. Other configurations are possible and within the scope of the present subject matter.

As used herein, "energy source" may be used to refer to any device or system of devices configured for directing an energy beam of suitable power and other operating characteristics towards a layer of additive powder to sinter, melt, or otherwise fuse a portion of that layer of additive powder during the build process. For example, energy source 120 may be a laser or any other suitable irradiation emission directing device or irradiation device. In this regard, an irradiation or laser source may originate photons or laser beam irradiation that is directed by the irradiation emission directing device or beam steering apparatus.

The beam steering apparatus 124 includes one or more mirrors, prisms, lenses, and/or electromagnets operably coupled with suitable actuators and arranged to direct and focus the energy beam 122. In this regard, for example, the beam steering apparatus 124 may be a galvanometer scanner that moves or scans the focal point of the laser beam 122 emitted by the energy source 120 across the build surface 130 during laser melting and sintering processes. In this regard, the energy beam 122 can be focused to a desired spot size and steered to a desired position in plane coincident with the build surface 130. The galvanometer scanner in powder bed fusion technologies is typically of a fixed position but the movable mirrors/lenses contained therein allow various properties of the laser beam to be controlled and adjusted. In some embodiments, the beam steering apparatus 124 may further include one or more of the following: optical lenses, deflectors, mirrors, beam splitters, telecentric lenses, etc.

It should be appreciated that other types of energy sources 120 may be used that may use an alternative beam steering apparatus 124. For example, an electron beam gun or other electron source may be used to originate a beam of electrons (e.g., an "e-beam"). The e-beam may be directed by any suitable irradiation emission directing device preferably in a vacuum. When the irradiation source is an electron source, the irradiation emission directing device may be, for example, an electronic control unit which may include, for example, deflector coils, focusing coils, or similar elements. In some embodiments, the energy source 120 may include one or more of a laser, an electron beam, a plasma arc, an electric arc, etc. In some embodiments, the AM system 100 can include a plurality of energy sources. The plurality of energy sources can be different types of energy sources, such as any of the energy sources noted herein.

Prior to an additive manufacturing process, the recoater actuator 160 may be lowered to provide a supply of powder 142 of a desired composition (for example, metallic, ceramic, and/or organic powder) into the supply container 150. In addition, the platform actuator 164 may move the build platform 118 to an initial high position, e.g., such that it is substantially flush or coplanar with build surface 130. The build platform 118 is then lowered below build surface 130 by a selected layer increment. The layer increment affects the speed of the additive manufacturing process and the resolution of parts or components being manufactured. As an example, the layer increment may be about 10 to 100 micrometers (0.0004 to 0.004 in.).

Additive powder is then deposited over the build platform 118 before being fused by energy source 120. Specifically, the supply actuator 154 may raise the supply platform 152 to push powder through the supply opening 140, exposing it above the build surface 130. The recoater mechanism 114 may then be moved across the build surface 130 by the recoater actuator 160 to spread the raised additive powder 142 horizontally over the build platform 118 (e.g., at the selected layer increment or thickness). Any excess additive powder 142 drops through the reservoir opening 144 into the overflow reservoir 116 as the recoater mechanism 114 passes from left to right (as shown in FIG. 1). Subsequently, the recoater mechanism 114 may be moved back to a starting position.

Figure 2:
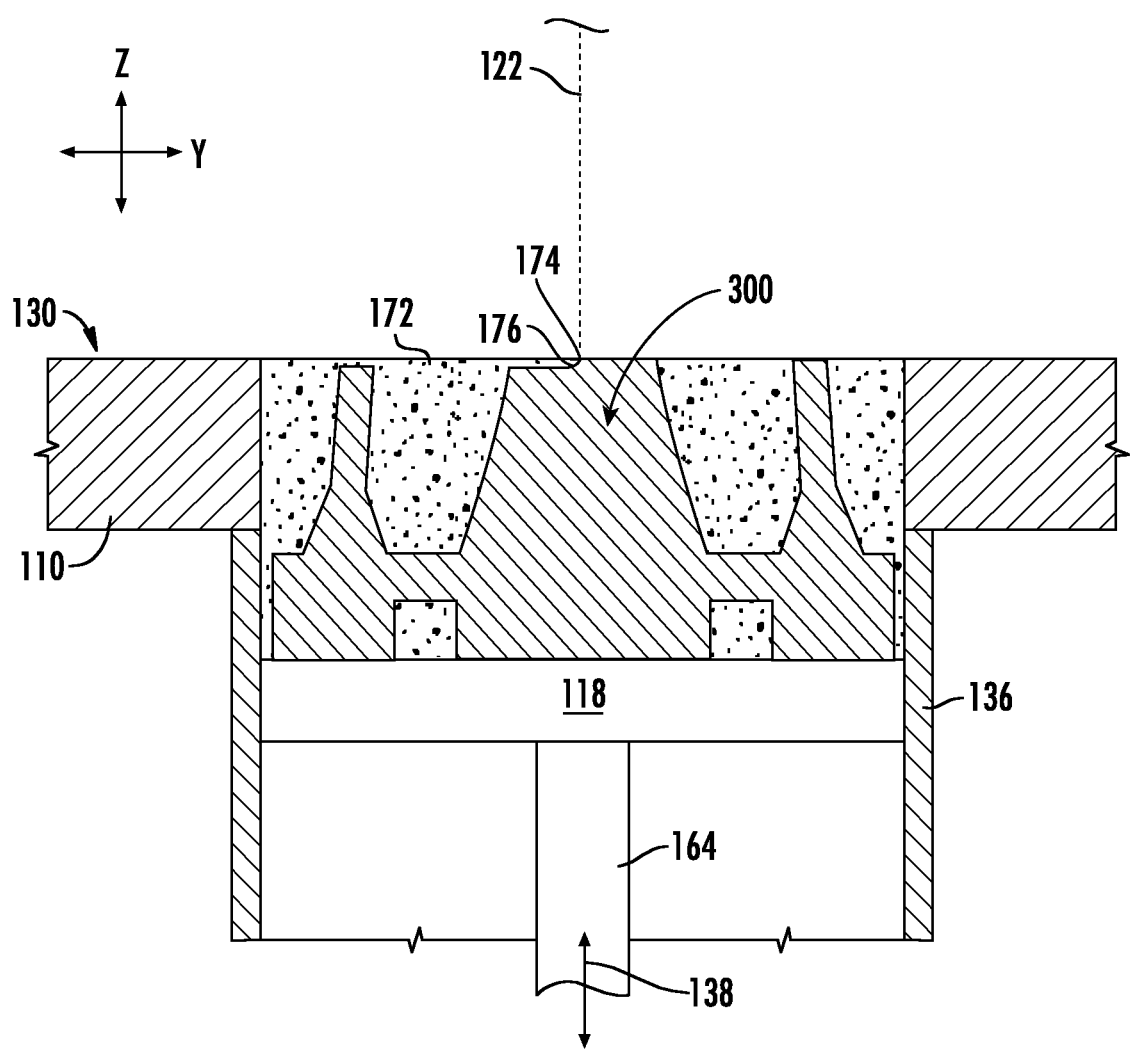
FIG. 2 provides a close-up schematic view of a build platform of the additive manufacturing machine of FIG. 1.

Therefore, as explained herein and illustrated in FIG. 1, the recoater mechanism 114, recoater actuator 160, supply platform 152, and the supply actuator 154 may generally operate to successively deposit layers of additive powder 142 or other additive material to facilitate the print process. As such, these components may collectively be referred to herein as a powder dispensing apparatus, system, or assembly. The leveled additive powder 142 may be referred to as a "build layer" 172 (see FIG. 2) and the exposed upper surface thereof may be referred to as build surface 130. When the build platform 118 is lowered into the build chamber 134 during a build process, the build chamber 134 and the build platform 118 collectively surround and support a mass of additive powder 142 along with any components being built. This mass of powder is generally referred to as a "powder bed," and this specific category of additive manufacturing process may be referred to as a "powder bed process."

During the additive manufacturing process, the directed energy source 120 is used to melt a two-dimensional cross-section or layer of the component 300 being built. More specifically, the energy beam 122 is emitted from the energy source 120 and the beam steering apparatus 124 is used to steer the focal point 174 of the energy beam 122 over the exposed powder surface in an appropriate pattern (referred to herein as a "toolpath"). A small portion of the exposed layer of the additive powder 142 surrounding the focal point 174, referred to herein as a "weld pool" or "melt pool" or "heat effected zone" 176 (shown best in FIG. 2) is heated by the energy beam 122 to a temperature allowing it to sinter or melt, flow, and consolidate. As one example, the melt pool 176 may be on the order of 100 micrometers (0.004 in.) wide. This step may be referred to as fusing additive powder 142.

The build platform 118 is moved vertically downward by the layer increment, and another layer of additive powder 142 is applied in a similar thickness. The directed energy source 120 again emits the energy beam 122 and the beam steering apparatus 124 is used to steer the focal point 174 of the energy beam 122 over the exposed powder surface in an appropriate pattern. The exposed layer of additive powder 142 is heated by the energy beam 122 to a temperature allowing it to sinter or melt, flow, and consolidate both within the top layer and with the lower, previously-solidified layer. This cycle of moving the build platform 118, applying additive powder 142, and then directing the energy beam 122 to melt additive powder 142 is repeated until the entire component 300 is complete. The additively manufactured component can be a monolithic component.

Referring again to FIG. 1, the AM system 100 includes a controller 180 that can be communicatively coupled with some or all parts of the AM system 100 or external control systems for facilitating system operation. For example, the controller 180 can be communicatively coupled with a user interface panel 182 to permit operator communication with the AM system 100, e.g., to input commands, upload printing toolpaths or CAD models, initiating operating cycles, or otherwise control the operation of various components of the AM system 100. In general, the controller 180 may be communicatively coupled with all systems and subsystems within the AM system 100 to permit communication and data transfer therebetween. In this manner, the controller 180 may be generally configured for operating the AM system 100 and/or performing one or more of the methods described herein.

Figure 3:
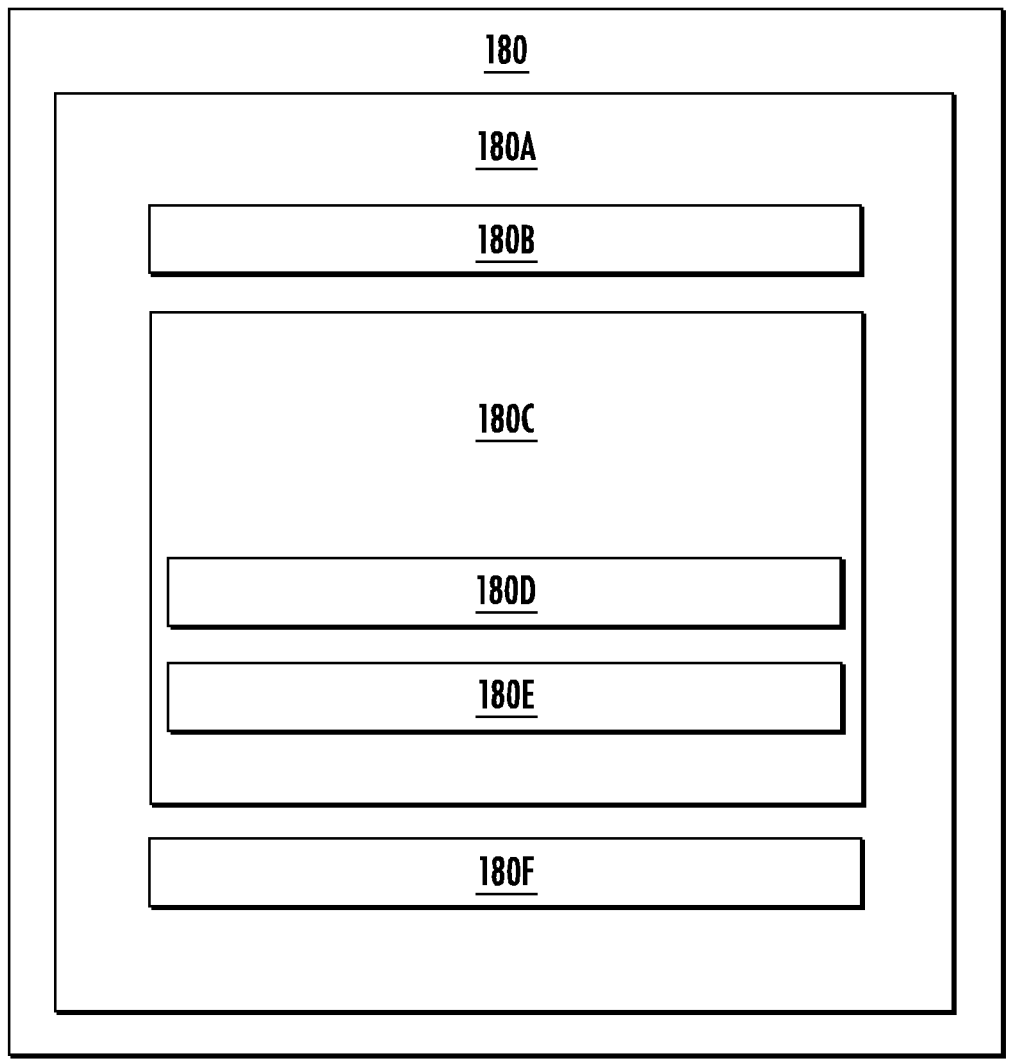
FIG. 3 provides a block diagram of certain components of a controller of additive manufacturing machine of FIG. 1.

FIG. 3 provides a block diagram of certain components of the controller 180 of the AM system 100. The controller 180 can include one or more computing device(s) 180A which may be used to implement the methods and computer-readable instructions described herein. The computing device(s) 180A can include one or more processor(s) 180B and one or more memory device(s) 180C. The one or more processor(s) 180B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 180C can include one or more non-transitory computer-readable storage medium(s), such as RAM, ROM, EEPROM, EPROM, flash memory devices, magnetic disks, etc., and/or combinations thereof.

The memory device(s) 180C can include one or more computer-readable media and can store information accessible by the one or more processor(s) 180B, including instructions 180D that can be executed by the one or more processor(s) 180B. For instance, the memory device(s) 180C can store instructions 180D for running one or more software applications, displaying a user interface, receiving user input, processing user input, etc. In some implementations, the instructions 180D can be executed by the one or more processor(s) 180B to cause the one or more processor(s) 180B to perform operations, e.g., such as one or more portions of methods described herein. The instructions 180D can be software written in any suitable programming language or can be implemented in hardware. Additionally, and/or alternatively, the instructions 180D can be executed in logically and/or virtually separate threads on processor(s) 180B.

The one or more memory device(s) 180C can also store data 180E that can be retrieved, manipulated, created, or stored by the one or more processor(s) 180B. The data 180E can include, for instance, data to facilitate performance of methods described herein. The data 180E can be stored in one or more database(s) or datastore(s). The one or more database(s) or datastore(s) can be connected to controller 180 by a high bandwidth LAN or WAN, or can also be connected to controller through one or more network(s) (not shown). The one or more database(s) or datastore(s) can be split up so that they are located in multiple locales or they can all be located in the same location. In some implementations, the data 180E can be received from another device.

The computing device(s) 180A can also include a communication module or interface 180F used to communicate with one or more other component(s) of the controller 180 or the AM system 100 over the network(s). The communication interface 180F can include any suitable components for interfacing with one or more network(s), including for example, transmitters, receivers, ports, controllers, antennas, or other suitable components.

Figure 4:
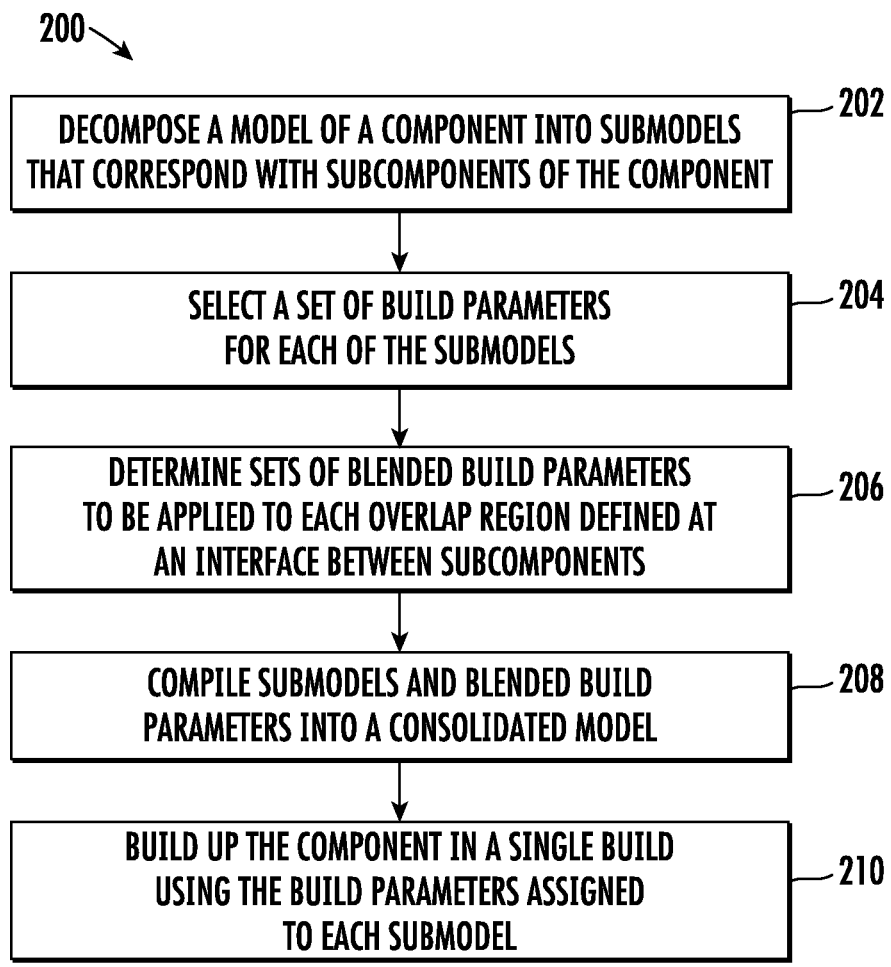
FIG. 4 provides a flow diagram for a method of additively manufacturing a component according to one example embodiment of the present subject matter.

FIG. 4 provides a flow diagram for a method (200) of additively manufacturing a component according to one example embodiment of the present subject matter. For instance, the method (200) can be used to form components using the AM system 100 described above and illustrated in FIG. 1. In this manner, the AM system 100 and the controller 180 thereof can be configured to implement some or all aspects of method (200). However, it will be appreciated that the method (200) can be implemented using other suitable additive manufacturing systems. Various components of the AM system 100 of FIG. 1 and the controller 180 of FIG. 3 will be referred to below to provide context to the implementation of the method (200).

At (202), the method (200) includes decomposing a model of a component into submodels that each correspond to a subcomponent of the component. Stated another way, the model is decomposed into submodels that represent constituent parts of the component. The one or more processors 180B of the controller 180 can be configured to decompose the model of the component to be additively manufactured, and more particularly, to decompose the model into submodels that each correspond to a subcomponent of the component. The model of the component can be any suitable type of model, such as a 3D CAD model or a point cloud model constructed by scanning the component to determine the 3D information associated with the component. The model can include 3D data indicating the coordinates or overall geometry of the component. The model can include other data as well, such as, without limitation, finite element analysis data, product life cycle data, manufacturing data, material data, etc. The component can be a unitary body or monolithic component. The subcomponents can be portions or sub-elements of the monolithic component.

Figure 5:
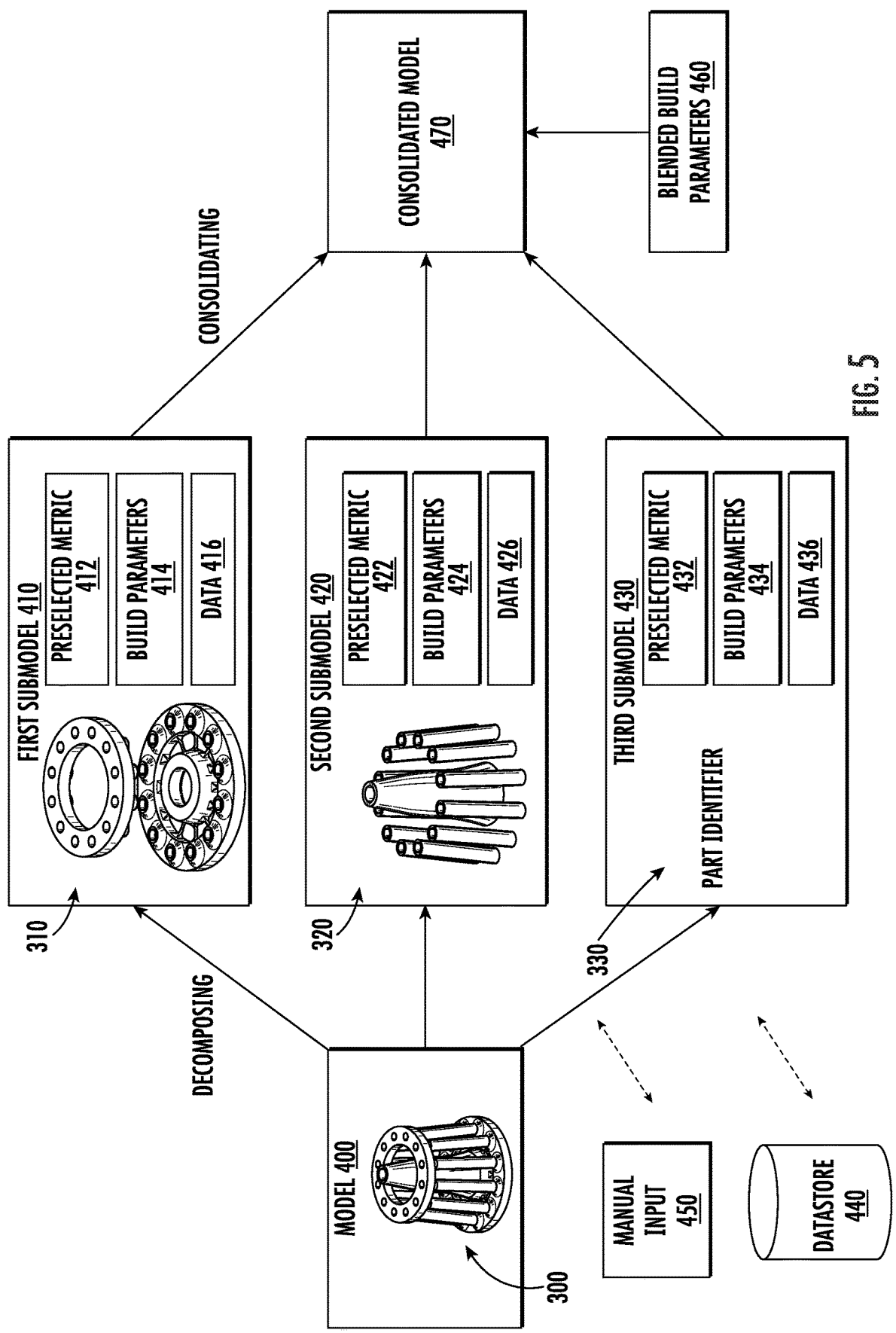
FIG. 5 provides a block diagram schematically depicting implementation aspects of the method of FIG. 4.

By way of example, FIG. 5 provides a block diagram schematically depicting implementation aspects of the method (200). As shown in FIG. 5, a model 400 represents a component 300 to be additively manufactured, e.g., by the AM system 100. The model 400 can be a 3D CAD model, for example. As depicted, the model 400 is decomposed into constituent parts or submodels. Particularly, for this example embodiment, the model 400 is decomposed into a first submodel 410, a second submodel 420, and a third submodel 430. In other embodiments, a model can be decomposed or deconstructed into less than three or more than three submodels. Each model 410, 420, 430 corresponds with a subelement or subcomponent of the component 300. Specifically, the first submodel 410 corresponds with a first subcomponent 310, the second submodel 420 corresponds with a second subcomponent 320, and the third submodel 430 corresponds with a third subcomponent 330.

Each submodel 410, 420, 430 includes data associated with its associated subcomponent. Particularly, the first submodel 410 includes data 416 associated with the first subcomponent 310, the second submodel 420 includes data 426 associated with the second subcomponent 320, and the third submodel 430 includes data 436 associated with the third subcomponent 330. The data 416, 426, 436 can include 3D data associated with the respective subcomponents. The 3D data can define or describe the subcomponent in space.

FIGS. 6 through 10 provide various perspective views of the component 300 and its constituent subcomponents 310, 320, 330. It will be appreciated that the component 300 illustrated in FIGS. 6 through 10 and described in the accompany text is one non-limiting example of a component that can be built up in accordance with the methods and/or by the systems disclosed herein; other components having different sizes, configurations, shapes, subcomponents, etc. can be built up in accordance with the methods and/or by the systems disclosed herein as well. For reference, the component 300 defines an axial direction A, a radial direction R, and a circumferential direction C. The component 300 also defines a longitudinal centerline LC extending along the axial direction A. For this example embodiment, the component 300 has a unitary body. Stated another way, the component 300 is a monolithic component. The various subcomponents 310, 320, 330 will be described below.

Figure 6:
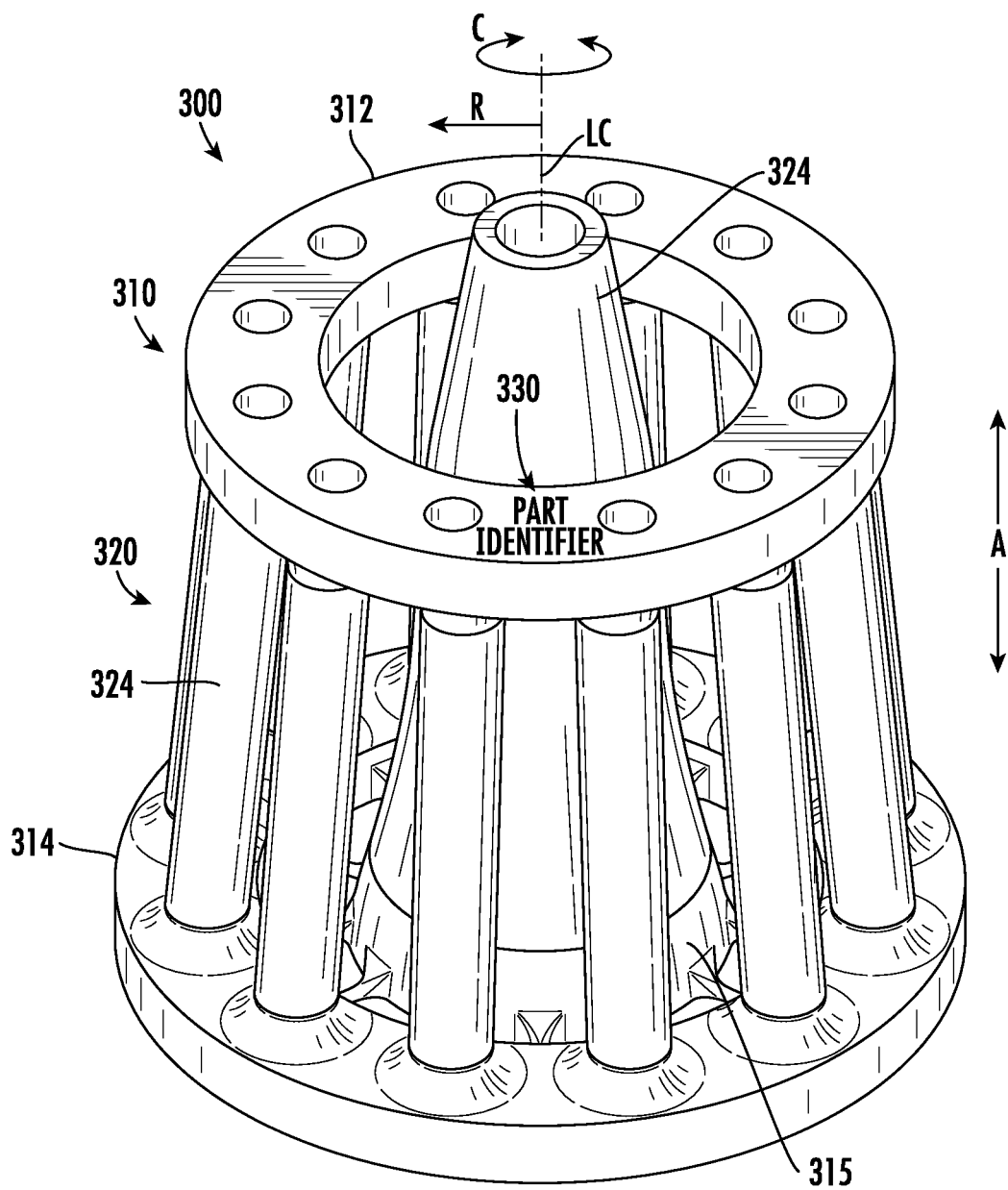
FIG. 6 provides a perspective view of a component that can be additively manufactured according to one example embodiment of the present subject matter.
Figure 7:
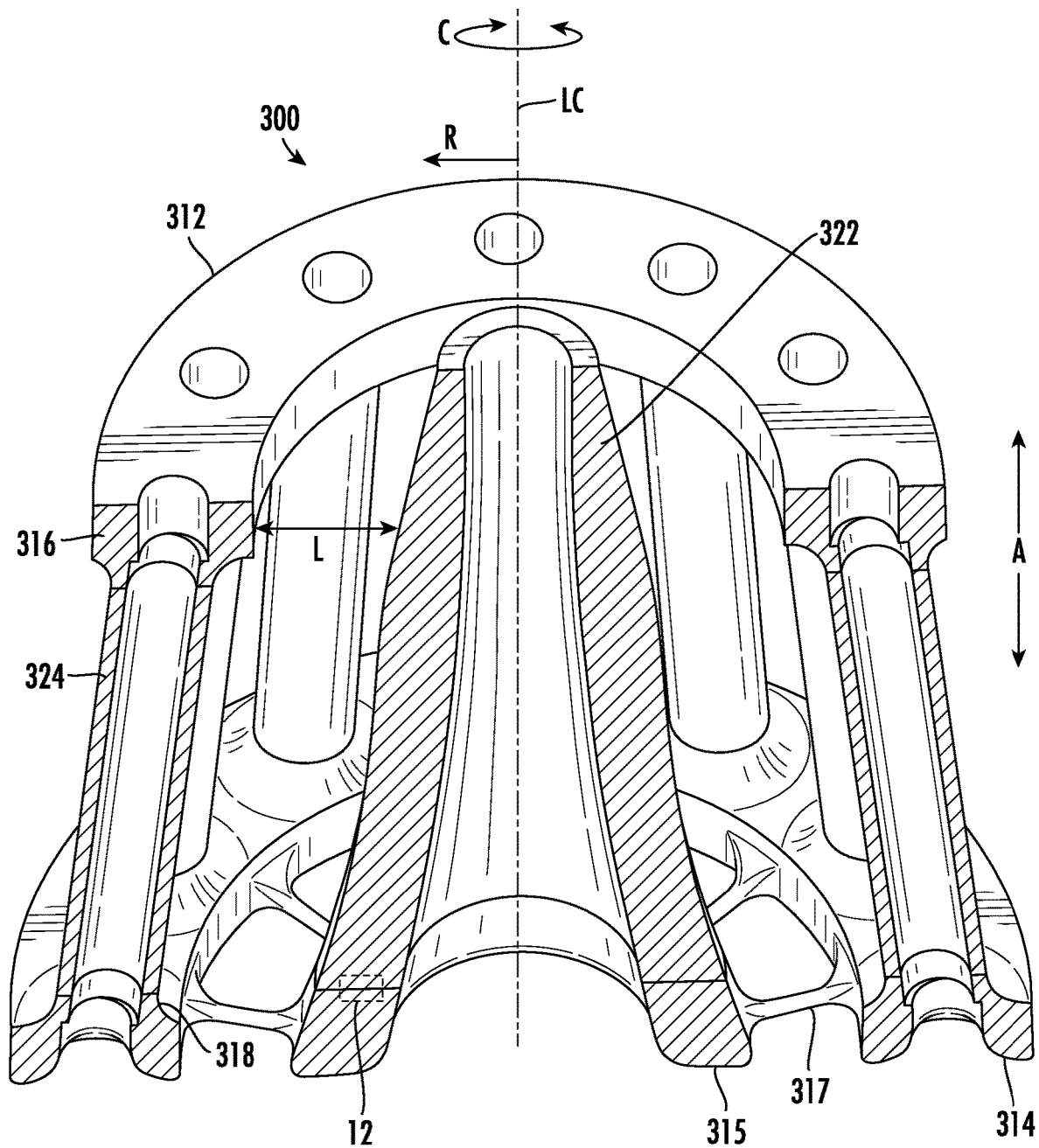
FIG. 7 provides a perspective cross-sectional view of the component of FIG. 6.
Figure 8:
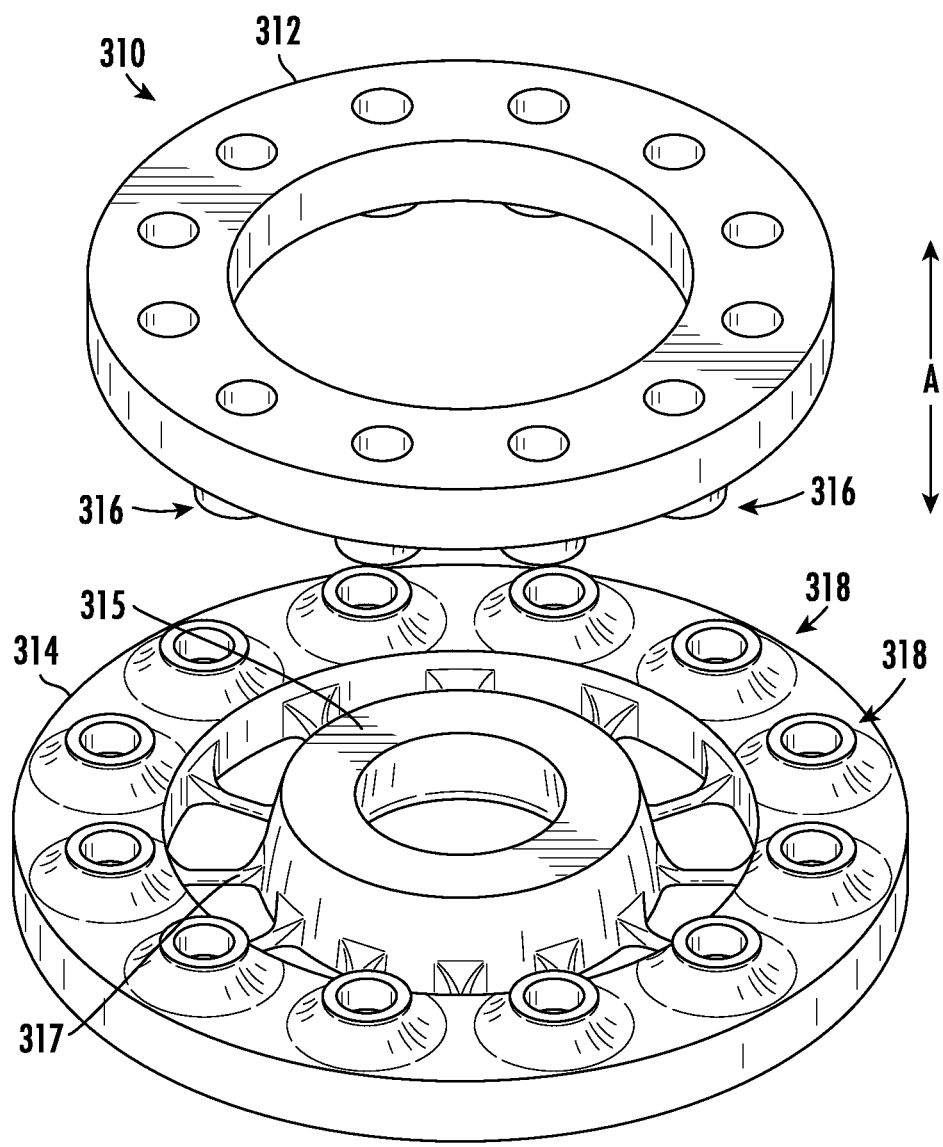
FIG. 8 provides a perspective view of a first subcomponent of the component of FIG. 6.

As shown best in FIGS. 6, 7, and 8, the first subcomponent 310 of the component 300 is a structural element that includes a first annular member 312 and a second annular member 314 spaced from the first annular member 312, e.g., along the axial direction A. The first annular member 312 includes a plurality of circumferentially spaced receiving members 316 and the second annular member 314 includes a plurality of circumferentially spaced receiving members 318. The first subcomponent 310 also includes a central hub 315 connected to the second annular member 314 by a plurality of circumferentially spaced and radially extending connecting members 317.

Figures 9, 10:
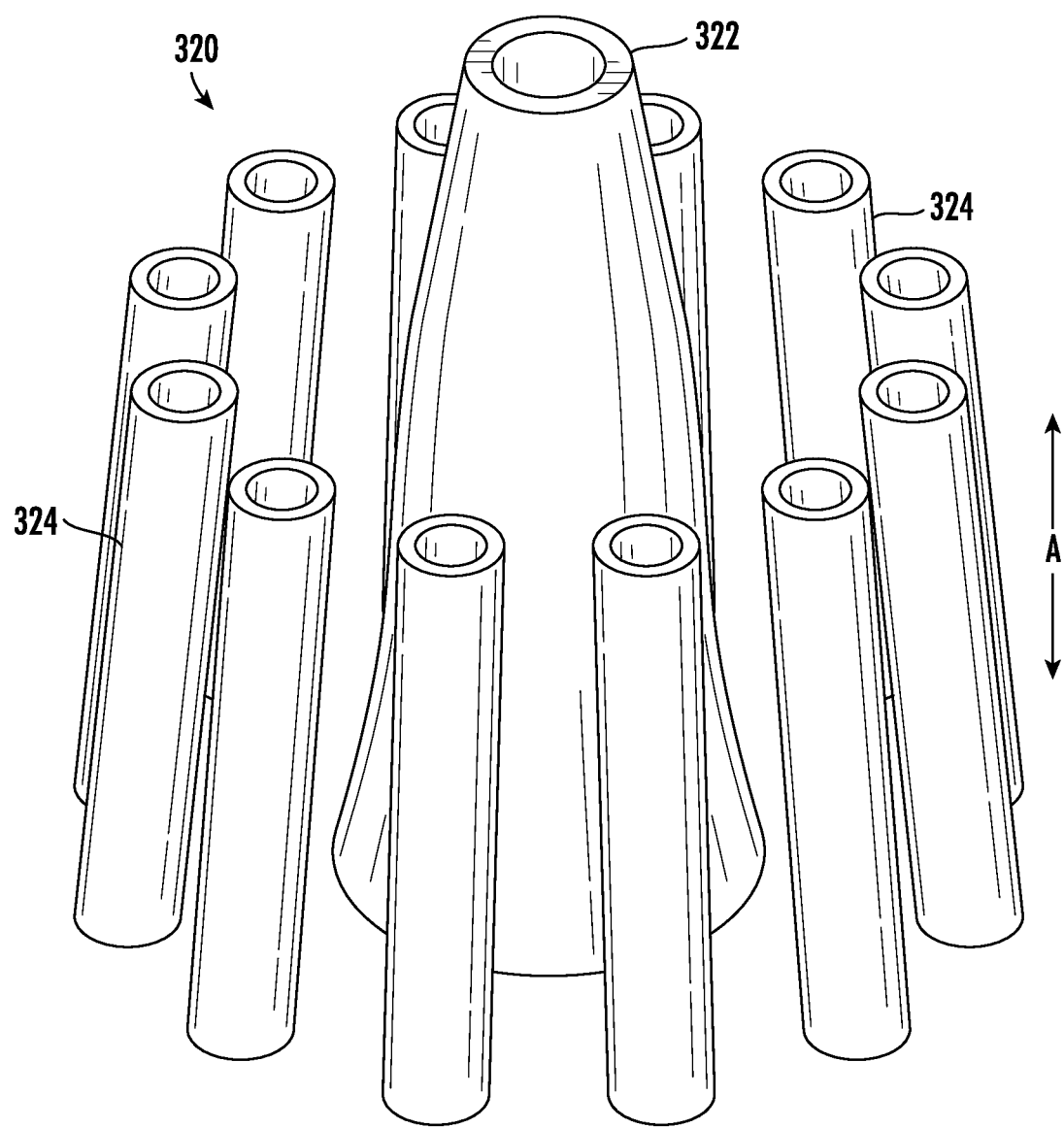
FIG. 9 provides a perspective view of a second subcomponent of the component of FIG. 6.
FIG. 10 provides a view of a third subcomponent of the component of FIG. 6.

As shown best in FIGS. 6, 7, and 9, the second subcomponent 320 of the component 300 is an aero loading element. The second subcomponent 320 includes a main body 322 that is generally a hollow cylindrical body that extends longitudinally along the axial direction A. The diameter of the top end of the main body 322 is smaller than the diameter of the bottom end of the main body 322. The second subcomponent 320 also includes a plurality of secondary bodies 324 that are generally hollow cylindrical bodies that extend longitudinally along the axial direction A. The secondary bodies 324 are spaced from one another along the circumferential direction C and are spaced from the main body 322 along the radial direction R.

As illustrated in FIGS. 6 and 7, the main body 322 extends or projects from the central hub 315 of the first subcomponent 310 along the axial direction A. The top end of the main body 322 is received through the opening defined by the first annular member 312. The secondary bodies 324 extend between and connect the first annular member 312 and the second annular member 314. Particularly, each secondary body 324 extends between one of the receiving members 316 of the first annular member 312 and a respective receiving member 318 of the second annular member 314.

As shown in FIGS. 6 and 10, the third subcomponent 330 is a part label or part identifier. The part identifier, as the name suggests, identifies the component 300. The part identifier can include a serial number, date and place of manufacture of the component 300, a model number, etc. Any suitable identifying information of the component 300 can be included in the part identifier. The third subcomponent 330 can be positioned in any suitable location on the component 300.

Referring again to FIG. 5, as noted above, the model 400 representing the component 300 is decomposed into the submodels 410, 420, 430 that correspond with their respective or corresponding subcomponents 310, 320, 330 of the component 300. Notably, each of the subcomponents 310, 320, 330 have a preselected metric associated therewith. For instance, for this example embodiment, the first subcomponent 310 has a first preselected metric 412 associated therewith, the second subcomponent 320 has a second preselected metric 422 associated therewith, and the third subcomponent 330 has a third preselected metric 432 associated therewith.

In some embodiments, a preselected metric associated with a subcomponent can be a quality metric or a measurable critical-to-quality metric. As one example, it can be determined (e.g., via engineering analysis) that a subcomponent requires a specific strength and durability for the intended application of the component. As another example, it may be determined that a subcomponent requires a particular surface finish, e.g., a particular smoothness or roughness. Further, as another example, it may be determined that the subcomponent requires a particular heat transfer capability. As another example, the subcomponent may require a particular resolution, e.g., so that a label is legible. As a further example, a subcomponent can have a particular weight requirement. Subcomponents of a component can have other application specific or critical-to-quality metrics associated therewith. The examples provided are not intended to be limiting.

The model 400 can be decomposed into the submodels based at least in part on the preselected metrics 412, 422, 432. Particularly, for this example embodiment, the first preselected metric 412 associated with the first subcomponent 310 is a strength and durability metric. The strength and durability metric associated with the first subcomponent 310 is a strength and durability requirement that, when the component 300 is built up by an additive manufacturing machine, the first subcomponent 310 must meet. The second preselected metric 422 associated with the second subcomponent 320 is a surface finish metric. The surface finish metric associated with the second subcomponent 320 is a surface finish requirement that, when the component 300 is built up by an additive manufacturing machine, the second subcomponent 320 must meet. The third preselected metric 432 associated with the third subcomponent 330 is a resolution metric. The resolution metric associated with the third subcomponent 330 is a resolution requirement that, when the component 300 is built up by an additive manufacturing machine, the third subcomponent 330 must meet. In some embodiments, a subcomponent can have a plurality of preselected metrics associated therewith. In such embodiments, the preselected metrics can be ranked in a hierarchical manner, e.g., in order of importance or criticality. In the event the metrics are incompatible with one another, the more important or critical metrics would control.

In addition to decomposing the model 400 into submodels based at least in part on the preselected metrics associated with the respective subcomponents of the component, in some implementations, the model 400 can be decomposed into submodels based at least in part on an intended function of a feature or subcomponent of the component. For example, after the component is built up via an additive manufacturing machine, it may be intended to machine or otherwise remove a portion of the component. The portion of the component that is intended to be removed from the component can be defined as a subcomponent. The model can be decomposed such that one of the submodels represents the designated portion of the component to be removed.

Figure 11:
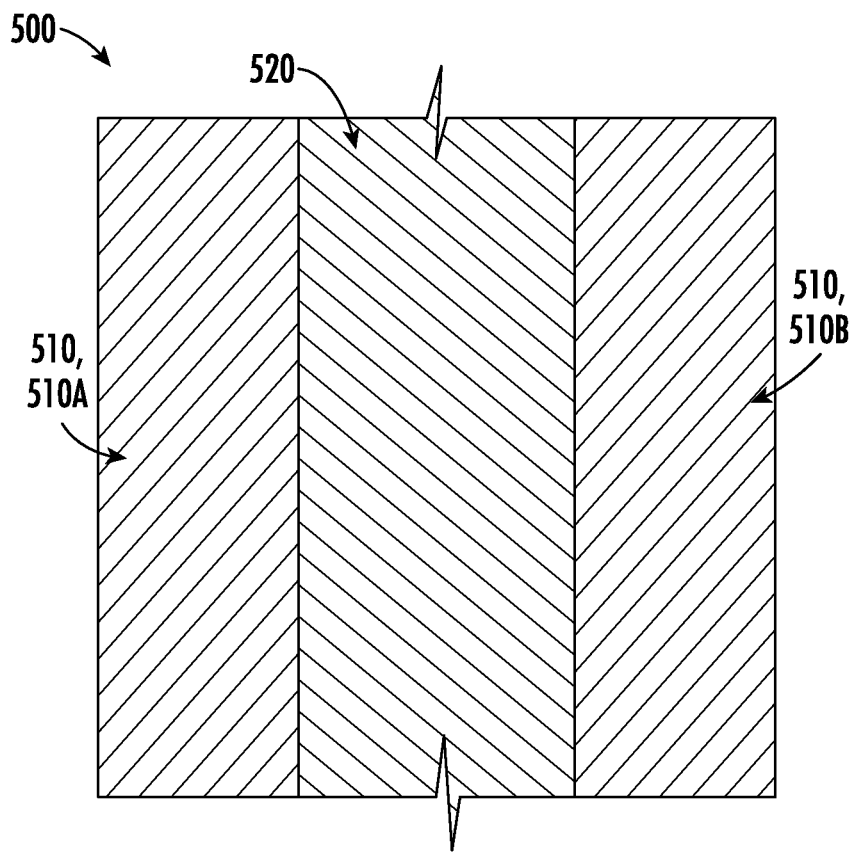
FIG. 11 provides a cross-sectional view of a portion of a component according to one example embodiment of the present subject matter.

Furthermore, in some implementations, the model 400 can be decomposed into submodels based at least in part on build speed customization. For example, FIG. 11 provides a cross-sectional view of a portion of a component 500. The component 500 has a preselected metric associated therewith. For instance, the preselected metric can be a strength and durability metric. Despite the component 500 having a strength and durability metric, a model of the component 500 can be decomposed into submodels that represent corresponding subcomponents of the component 500 based at least in part on build speed customization.

Particularly, the component 500 can be defined as having a first subcomponent 510 that forms the outer walls of the component 500, the first subcomponent 510 including a first outer wall 510A and a second outer wall 510B. The component 500 can also be defined as having a second subcomponent 520 defined between the first and second outer walls 510A, 510B of the first subcomponent 510. It may be determined that despite the strength and durability metric requirement for the component 500 that the portion of the component 500 between the outer walls can be built up at a faster build speed whilst still meeting the strength and durability metric requirement. In such an example, the middle portion disposed between the outer walls can be defined as separate subcomponents, e.g., as subcomponents 510, 520. A model of the component 500 can be decomposed into submodels corresponding to the subcomponents 510, 520, 530. Advantageously, this can reduce build times while still meeting or achieving the preselected metric.

In some implementations, the model 400 is decomposed into the submodels 410, 420, 430 such that each subcomponent 310, 320, 330 that corresponds with the submodels 410, 420, 430 is sliced or defined at a layer thickness that is a least common multiple of a layer thickness of an adjacent subcomponent. For instance, suppose the layer thickness of the first subcomponent 310 is set to be 30 µm and the layer thickness of the second subcomponent 320 is set to be 50 µm. In such an example, the least common multiple of layer thickness is 10 µm. Accordingly, in this instance, the first and second subcomponent 310, 320 as represented by their submodels 410, 420 would be decomposed or sliced at a thickness layer of 10 µm. This facilitates decomposing the model 400 into the submodels 410, 420, 430, and in some implementations, facilitates consolidation of the submodels 410, 420, 430 into a consolidated model as will be described herein.

At (204), returning to FIG. 4, the method (200) includes selecting a set of build parameters for each of the submodels based at least in part on the preselected metrics associated with the subcomponents. For instance, the one or more processors 180B of the controller 180 can be configured to select a set of build parameters for each of the submodels based at least in part on the preselected metrics associated with the subcomponents. As shown in FIG. 5, a first set of build parameters 414 can be selected for the first submodel 410, a second set of build parameters 424 can be selected for the second submodel 420, and a third set of build parameters 434 can be selected for the third submodel 430. The build parameters selected for the respective submodels can be different from one another. In some instances, some of the build parameters of one set can be the same as the build parameters of another set.

Example build parameters include, without limitation, an energy source power, a scan velocity, and a beam focal spot size. These parameters can be set or selected such that when the component is built up, the subcomponent meets or achieves the design intent or preselected metric associated with that subcomponent of the component. In some implementations, each set of build parameters includes an energy source power, a scan velocity, and a beam focal spot size. In some implementations, other build parameters are possible.

For instance, in some implementations, the additive manufacturing machine designated for building up the component can be a hybrid additive machine having multiple energy source types. The hybrid additive machine can have at least two energy sources, such as at least two of any of the energy sources noted herein. For example, the hybrid additive machine can include at least two of: a beam steering apparatus (e.g., the beam steering apparatus 124 of the AM system 100), an electron beam gun or source, a laser, a plasma arc, an electric arc, a projector, and optic, etc. Accordingly, in some implementations, selecting the sets of build parameters for the submodels can include selecting an energy source type for each of the submodels based at least in part on the preselected metrics associated with the subcomponents. In such implementations, the subcomponents can be built up using their respective selected energy source types.

In some implementations, the one or more processors 180B of the controller 180 can automatically select the sets of build parameters for the submodels. As one example, the one or more processors 180B can determine a set of build parameters for a submodel by matching the preselected metric associated with the subcomponent with a predefined metric of a table that correlates predefined metrics with sets of build parameters. Stated another way, the one or more processors 180B can match or best match the preselected metric with a predefined metric in a lookup table, and the set of build parameters associated with the predefined metric that matches or best matches the preselected metric is selected as the set of build parameters. The table can be stored in a datastore 440. The datastore 440 can be a memory device 180C of the controller 180, a database, or some other data storage medium. In some implementations, the one or more processors 180B can implement or execute one or more machine learning techniques for matching the preselected metrics with predefined metrics of the table. In other implementations, the one or more processors 180B can implement or execute one or more machine learning techniques to determine a set of build parameters for one of the subcomponents based at least in part on one or more of the preselected metric associated with the subcomponent, the geometry of the subcomponent (as determined from the data associated with the submodel).

The build parameters correlating to respective predefined metrics can be set, e.g., based on engineering analysis. For instance, based on an engineering analysis, it may be determined that a certain energy source power and scan speed can produce a component that meets the desired metric at the associated subcomponent of the component. Sets of build parameters can be correlated to respective types of predefined metrics, such as surface finish metrics, resolution metrics, strength and durability metrics, etc. and stored in the datastore In some implementations, one or more of the sets of build parameters selected for the submodels can be selected based at least in part on an intended function of a feature or subcomponent of the component. The one or more processors 180B can be configured to select a set of build parameters for each of the submodels based at least in part on an intended function of a feature or subcomponent of the component. As one example, a set of build parameters can be selected based on at least one subcomponent being designated for removal from the component (after the component is built up).

In some implementations, one or more of the sets of build parameters selected for the submodels can be selected based at least in part on a build speed customization. For instance, a set of build parameters can be selected to reduce the build time of a portion of the component. The one or more processors 180B can be configured to select a set of build parameters for each of the submodels based at least in part on a build speed customization designated for one or more of the subcomponents.

In yet other implementations, one, some, or all of the sets of build parameters can be selected based at least in part on the preselected metrics associated with the subcomponents, an intended function of a feature or subcomponent of the component, and/or based at least in part on a build speed customization designated for one or more of the subcomponents by an operator manually inputting values for the build parameters of the sets. A manual input 450 is shown schematically in FIG. 5. In some instances, the operator can manually alter values of build parameters automatically determined by the one or more processors 180B, e.g., based on engineering observation.

At (206), referring again to FIG. 4, the method (200) optionally includes determining, for each overlap region of the component, a set of blended build parameters. Each of the overlap regions are defined at an interface between adjacent subcomponents of the component. The set of blended build parameters for each of the overlap regions can be determined based at least in part on the set build parameters associated with the submodels corresponding to the adjacent subcomponents. The one or more processors 180B of the controller 180 can determine the sets of blended build parameters. By blending the build parameters at the overlap regions between interfacing subcomponents, proper fusion between the subcomponents can be achieved.

Figure 12:
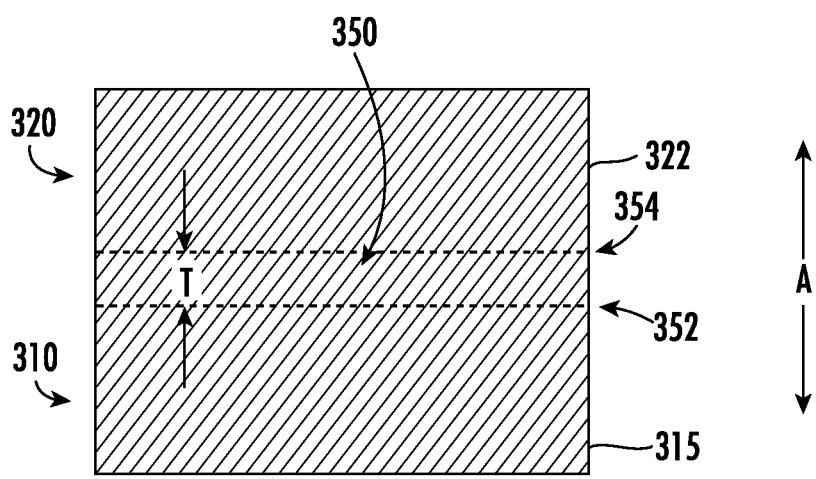
FIG. 12 provides a close-up view of Section 12 of the component of FIG. 7.

By way of example, FIG. 12 provides a close-up view of Section 12 of the component 300 of FIG. 7. As depicted in FIG. 12, the main body 322 of the second subcomponent 320 interfaces with the central hub 315 of the first subcomponent 310 (see also FIG. 7). An overlap region 350 is defined at the interface between the first subcomponent 310 and the second subcomponent 320, or more particularly for the depicted portion of the component 300 of FIG. 12, the overlap region 350 is defined at the interface between the main body 322 of the second subcomponent 320 and the central hub 315 of the first subcomponent 310. The overlap region 350 has a thickness T or height that extends along the axial direction A. The overlap region 350 extends between a first end 352 and a second end 354. It will be appreciated that the thickness T of the overlap region 350 can extend along other directions as well depending on the orientation of the interface between adjacent subcomponents. In some implementations, the overlap region 350 is defined entirely within a single layer. In other implementations, the overlap region 350 is defined such that the overlap region 350 spans a plurality of layers.

In some implementations, the one or more processors 180B can define the thickness T and overall area of the overlap region 350 as well as the overlap regions defined at the interfaces between adjacent subcomponents of the component 300. For instance, using the data 416, 426 of the submodels 410, 420, the one or more processors 180B can determine the geometry and positioning of the subcomponents 310, 320 relative to one another in space. Further, the one or more processors can determine a matching score that indicates how closely the selected build parameters for the adjacent subcomponents match. For example, to determine the geometry of the overlap region 350, the one or more processors 180B can compare the first set of build parameters 414 with the second set of build parameters 424, and based on the comparison, the one or more processors 180B can determine a matching score. Based on the matching score and the geometry of the first and second subcomponents 310, 320 at the central hub 315/main body 322 interface, the one or more processors 180B can determine the area of the overlap region 350, including the thickness T and the plane in which the overlap region 350 extends. Generally, the higher the matching score (i.e., the closer the sets of build parameters match), the smaller the thickness T needed for the overlap region 350. Conversely, the lower the matching score (i.e., the further away the sets of build parameters are from matching), the larger the thickness T needed for the overlap region 350.

With the overlap region 350 defined, the one or more processors 180B of the controller 180 can determine how the build parameters are to be blended to build up the overlap region 350. As one example, the build parameters to build up the overlap region can be incrementally blended. The build parameters to build up the overlap region can be incrementally blended layer by layer or at a predetermined increment of layers. The parameters to build up the overlap region can be blended in other suitable manners as well.

FIG. 13 provides a graph depicting a manner in which two sets of build parameters can be incrementally blended to form a set of blended parameters according to one example embodiment of the present subject matter. Particularly, the graph of FIG. 13 depicts the first set of build parameters 414 associated with the first submodel as a function of the thickness of the overlap region and also depicts the second set of build parameters 424 associated with the second submodel as a function of the thickness of the overlap region. As depicted, the first set of build parameters 414 are incrementally stepped down from the first end 352 to the second end 354 of the thickness of the overlap region 350 and the second set of build parameters 424 are incrementally stepped up from the first end 352 to the second end 354 of the thickness of the overlap region 350. The build parameters 414, 424 are incremented five times over the thickness of the overlap region 350. The increments can be equal or different.

At a first increment I-1 proximate the first end 352, the first set of build parameters are stepped down from 100% to 80% and the second set of parameters 424 are stepped up from 0% to 20% to render an 80/20 blended mix. For example, suppose the value selected for the energy source power for the first set of build parameters 414 is greater than the value selected for the energy source power for the second set of build parameters 424. To blend the parameters at the first increment, the value for the energy source power would be decreased by 20% of the total intended change in the energy source power setting (i.e., the absolute value of the value selected for the energy source power for the first set of build parameters 414 minus the value selected for the energy source power for the second set of build parameters 424). The other build parameters can be blended in a similar manner. It will be appreciated that some values may increase and some value may decrease over the thickness T of the overlap region 350.

At the second increment I-2, the first set of build parameters are stepped down from 80% to 60% and the second set of parameters 424 are stepped up from 20% to 40% to render a 60/40 blended mix. Accordingly, continuing with the example above, the value for the energy source power would be decreased by another 20% of the total intended change in the energy source power setting. At the third increment I-3, the first set of build parameters are stepped down from 60% to 40% and the second set of parameters 424 are stepped up from 40% to 60% to render a 40/60 blended mix. Hence, with reference to the example above, the value for the energy source power would be decreased by another 20% of the total intended change in the energy source power setting. Further, at the fourth increment I-4, the first set of build parameters are stepped down from 40% to 20% and the second set of parameters 424 are stepped up from 60% to 80% to render a 20/80 blended mix. The value for the energy source power would be decreased by yet another 20% of the total intended change in the energy source power setting. Finally, at the fifth increment I-5, the first set of build parameters are stepped down from 20% to 0% and the second set of parameters 424 are stepped up from 80% to 100%. The value for the energy source power would be decreased by yet another 20% of the total intended change in the energy source power setting; accordingly, the value for the energy source power would be set at the selected value for the second set of build parameters 424. The component 300 can be additively manufactured in a single build using the determined set of blended build parameters. As will be appreciated, some or all of the build parameters to be applied to build up the overlap region 350 can be blended as described above or can be determined in other suitable ways.

Furthermore, it will be appreciated that overlap regions can be defined at each interface between adjacent subcomponents and that blended build parameters can be determined so that they can used to build up the overlap regions. Accordingly, as noted, the method (200) can include determining, for each overlap region of the component, a set of blended build parameters. Each of the overlap regions are defined at an interface between adjacent subcomponents of the component. The set of blended build parameters for each of the overlap regions can be determined based at least in part on the set build parameters associated with the submodels corresponding to the adjacent subcomponents. In this manner, the component (e.g., component 300) can be additively manufactured in a single build using the determined sets of blended build parameters.

At (208), referring again to FIG. 4, the method (200) includes compiling the submodels into a consolidated model. For instance, with reference to FIG. 5, the submodels 410, 420, 430 and their associated sets of build parameters 414, 424, 434 and data 416, 426, 436, as well as the determined blended build parameters 460 for each of the defined overlap regions can be consolidated by the one or more processors into a consolidated model 470. The data 416, 426, 436 can be used to rearrange the subcomponents 310, 320, 330 as represented by their respective submodels 410, 420, 430 back into the full component 300 or consolidated 3D model representing the component. In some implementations, the consolidated model 470 functions as the build instructions, that when executed by the one or more processors 180B of the controller 180, cause an additive manufacturing machine (e.g., the AM system 100 of FIG. 1) to build up the component 300 in accordance with the build instructions. In other implementations, the one or more processors 180B can generate build instructions based at least in part on the consolidated model 470.

In some alternative implementations, the submodels 410, 420, 430 can be consolidated into a preliminary consolidated model (not shown), the overlap regions can be defined as described above, and then the preliminary consolidated model and the determined blended sets of build parameters associated with the overlap regions can be compiled into the consolidated model 470. In other implementations, the submodels 410, 420, 430 need not be consolidated into a consolidated model. Rather, during additive manufacturing of the component, the one or more processors can receive all of the information/data to build the component 300 directly from the submodels 410, 420, 430 and the determined blended build parameters 460.

At (210), with reference once again to FIG. 4, the method (200) includes additively manufacturing the component in a single build by building up the subcomponents of the component using their respective selected sets of build parameters. In this manner, a component, such as the unitary body or monolithic component 300 provided herein, can be additively manufactured in a single build using multiple processing strategies. Further, in some implementations, the component can be additively manufactured in a single build by building up the overlap regions defined at the interfaces between subcomponents using the determined sets of blended build parameters.

The component can be additively manufactured in a single build by the one or more processors 180B executing the consolidated model 470 or build instructions generated based at least in part on the consolidated model 470. Alternatively, the component can be additively manufactured in a single build by the one or more processors 180B executing build instructions generated directly from the submodels 410, 420, 430 and the determined sets of blended build parameters 460.

Further, it will be appreciated in view of the teachings herein that multiple processing strategies can be used to build up a single layer of the component. Indeed, many layers of the component can each be built up using multiple processing strategies. Stated another way, for a given axial or vertical height of the component being built up, multiple sets of build parameters can be used to build up that axial or vertical portion of the component. As one example with reference to FIG. 7, for a layer L at the axial height depicted in FIG. 7, the first annular member 312 of the first subcomponent 310 is built up using the first set of build parameters 414 associated therewith and the main body 322 of the second subcomponent 320 is built up using the second set of build parameters 424 associated therewith. Accordingly, in some implementations, in building up the layers of the component by using one or more energy sources of an additive manufacturing machine, least two sets of the selected build parameters are used to build up the at least one of the layers. In some implementations, more than two sets of the selected build parameters can be used to build up a single layer of the component.

Advantageously, in accordance with the methods and systems described herein, components can be additively manufactured in a single build using multiple processing strategies. Particularly, applying different build parameters to different subcomponents of the same component allows for optimization and meeting the design intent of each subcomponent. For instance, the methods and systems described herein can enable additive manufactured components to meet multiple critical-to-quality metrics and can enable a hybrid-parts approach. Further, the methods and systems described herein can facilitate maximization of throughput, optimization of design performance capability, and can reduce waste/costs associated with conventional additively manufacturing build strategies.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

1. A method, comprising: decomposing a model representing a component into submodels that each correspond to a subcomponent of the component, each of the subcomponents having a preselected metric associated therewith, the model being decomposed into the submodels based at least in part on the preselected metrics; selecting a set of build parameters for each of the submodels based at least in part on the preselected metrics associated with the subcomponents; and additively manufacturing the component in a single build by building up the subcomponents of the component using their respective selected sets of build parameters.

2. The method of any preceding clause, wherein additively manufacturing the component using the selected sets of build parameters comprises building up a plurality of layers by using one or more energy sources of an additive manufacturing machine, and wherein for at least one of the plurality of layers, at least two sets of the selected build parameters are used to build up the at least one layer.

3. The method of any preceding clause, wherein the sets of build parameters each include an energy source power, a scan velocity, and a beam focal spot size.

4. The method of any preceding clause, further comprising: selecting an energy source type for each of the submodels based at least in part on the preselected metrics associated with the subcomponents, and wherein the subcomponents are built up using their respective selected energy source type.

5. The method of any preceding clause, wherein the submodels include a first submodel and a second submodel, the first submodel corresponding to a first subcomponent and the second submodel corresponding to a second subcomponent of the subcomponents, and wherein the method further comprises: defining an overlap region at an interface between the first subcomponent and the second subcomponent of the subcomponents; and determining a set of blended build parameters for the overlap region based at least in part on a first set of build parameters associated with the first submodel and a second set of build parameters associated with the second submodel, and wherein the component is additively manufactured in the single build using the determined set of blended build parameters.

6. The method of any preceding clause, wherein defining the overlap region comprises: determining a matching score that indicates how closely the first set of build parameters matches the second set of build parameters, and determining an area of the overlap region based at least in part on the matching score.

7. The method of any preceding clause, further comprising: determining, for each overlap region of the component, a set of blended build parameters, each of the overlap regions being defined at an interface between adjacent subcomponents of the component, the set of blended build parameters for each of the overlap regions being determined based at least in part on the set build parameters associated with the submodels corresponding to the adjacent subcomponents, and wherein the component is additively manufactured in the single build using the determined sets of blended build parameters.

8. The method of any preceding clause, wherein the model is decomposed into the submodels such that each subcomponent that corresponds with the submodels is sliced at a layer thickness that is a least common multiple of a layer thickness of an adjacent subcomponent.

9. The method of any preceding clause, wherein the model is decomposed into the submodels based at least in part on at least one of the subcomponents being designated for removal after the component is additively manufactured in the single build.

10. The method of any preceding clause, wherein the model is decomposed into the submodels based at least in part on a build speed customization associated with at least one of the subcomponents.

11. A system, comprising: an additive manufacturing machine; one or more processors; and one or more memory devices, the one or more memory devices storing computer-readable instructions that when executed by the one or more processors cause the one or more processors to perform operations, in performing the operations the one or more processors are configured to: decompose a model representing a component into submodels that each correspond to a subcomponent of the component, each of the subcomponents having a preselected metric associated therewith, the model being decomposed into the submodels based at least in part on the preselected metrics; select a set of build parameters for each of the submodels based at least in part on the preselected metrics associated with the subcomponents; and cause the additive manufacturing machine to additively manufacture the component in a single build by building up the subcomponents of the component using their respective selected sets of build parameters.

12. The system of any preceding clause, wherein the submodels include a first submodel and a second submodel, the first submodel corresponding to a first subcomponent and the second submodel corresponding to a second subcomponent of the subcomponents, and wherein the one or more processors are further configured to: define an overlap region at an interface between the first subcomponent and the second subcomponent of the subcomponents; and determine a set of blended build parameters for the overlap region based at least in part on a first set of build parameters associated with the first submodel and a second set of build parameters associated with the second submodel, and wherein the component is additively manufactured in the single build using the determined set of blended build parameters.

13. The system of any preceding clause, wherein in causing the additive manufacturing machine to additively manufacture the component in the single build by building up the subcomponents of the component using their respective selected sets of build parameters, the one or more processors are configured to: cause the additive manufacturing machine to additively manufacture the component by building up a plurality of layers using one or more energy sources of the additive manufacturing machine, and wherein for at least one of the plurality of layers, at least two sets of the selected build parameters are used to build up the at least one layer.

14. The system of any preceding clause, wherein the sets of build parameters each include an energy source power, a scan velocity, and a beam focal spot size.

15. The system of any preceding clause, wherein the one or more processors are configured to: select an energy source type for each of the submodels based at least in part on the preselected metrics associated with the subcomponents, and wherein the subcomponents are built up using their respective selected energy source type.

16. A non-transitory computer-readable medium comprising computer-executable instructions, which, when executed by one or more processors of a controller, cause the controller to: decompose a model representing a component into submodels that each correspond to a subcomponent of the component, each of the subcomponents having a preselected metric associated therewith, the model being decomposed into the submodels based at least in part on the preselected metrics; select a set of build parameters for each of the submodels based at least in part on the preselected metrics associated with the subcomponents; and cause an additive manufacturing machine to additively manufacture the component in a single build using the selected sets of build parameters.

17. The non-transitory computer-readable medium of any preceding clause, wherein the submodels include a first submodel and a second submodel, the first submodel corresponding to a first subcomponent and the second submodel corresponding to a second subcomponent of the subcomponents, and wherein when the computer-executable instructions are executed, the controller is caused to: define an overlap region at an interface between the first subcomponent and the second subcomponent of the subcomponents; and determine a set of blended build parameters for the overlap region based at least in part on a first set of build parameters associated with the first submodel and a second set of build parameters associated with the second submodel, and wherein the component is additively manufactured in the single build using the determined set of blended build parameters.

18. The non-transitory computer-readable medium of any preceding clause, wherein when the computer-executable instructions are executed, the controller is caused to: decompose the model into the submodels based at least in part on at least one of the subcomponents being designated for removal after the component is additively manufactured in the single build.

19. The non-transitory computer-readable medium of any preceding clause, wherein at least one of the sets of build parameters includes an energy source power, a scan velocity, and a beam focal spot size.

20. The non-transitory computer-readable medium of any preceding clause, wherein when the computer-executable instructions are executed, the controller is caused to: select an energy source type for each of the submodels based at least in part on the preselected metrics associated with the subcomponents, and wherein when the controller causes the additive manufacturing machine to additively manufacture the component in the single build using the selected sets of build parameters, the subcomponents are built up using their respective selected energy source type.

What is claimed is:

1. A system, comprising:
   an additive manufacturing machine;
   one or more processors; and
   one or more non-transitory memory devices, the one or more non-transitory memory devices storing computer-readable instructions that when executed by the one or more processors cause the one or more processors to perform operations, in performing the operations the one or more processors are configured to:
   decompose a model representing a component into submodels that each correspond to a subcomponent of the component, each of the subcomponents having a preselected quality metric associated therewith, the model being decomposed into the submodels based at least in part on the preselected quality metrics, wherein the submodels include a first submodel and a second submodel, the first submodel corresponding to a first subcomponent and the second submodel corresponding to a second subcomponent of the subcomponents and wherein the preselected quality metrics include at least one of the following: a strength, a durability, a roughness, a heat transfer capability, a resolution, or a weight;
   select a set of build parameters for each of the submodels based at least in part on the preselected quality metrics associated with the subcomponents, wherein the set of build parameters includes a first set of build parameters for the first submodel and a second set of build parameters for the second submodel;
   define an overlap region at an interface between the first subcomponent and the second subcomponent of the subcomponents;
   determine a set of blended build parameters for the overlap region based at least in part on a first set of build parameters associated with the first submodel and a second set of build parameters associated with the second submodel and wherein the blended build parameters are blended incrementally at predetermined increments of layers, wherein determining the set of blended build parameters includes determining a geometry of the overlap region, which includes comparing the first set of build parameters with the second set of build parameters, determining a matching score, and based on the matching score and a geometry of the first subcomponent and the second subcomponent, determining a thickness and a plane in which the overlap region extends; and
   cause the additive manufacturing machine to additively manufacture the component from at least one additive material in a single build by building up the subcomponents of the component using their respective selected sets of build parameters.

2. The system of claim 1, wherein in causing the additive manufacturing machine to additively manufacture the component in the single build by building up the subcomponents of the component using their respective selected sets of build parameters, the one or more processors are configured to:
   cause the additive manufacturing machine to additively manufacture the component by building up a plurality of layers using one or more irradiation devices of the additive manufacturing machine, and wherein for at least one of the plurality of layers, at least two sets of the selected build parameters are used to build up the at least one layer.

3. The system of claim 1, wherein the sets of build parameters each include an energy source power, a scan velocity, and a beam focal spot size.

4. The system of claim 1, wherein the one or more processors are configured to:
   select an irradiation device type for each of the submodels based at least in part on the preselected quality metrics associated with the subcomponents, and
   wherein the subcomponents are built up using their respective selected irradiation device type.

5. The system of claim 1, wherein the model is decomposed into the submodels such that each subcomponent that corresponds with the submodels is sliced at a layer thickness that is a least common multiple of a layer thickness of an adjacent subcomponent.

6. The system of claim 1, wherein the blending includes incrementally stepping down the first set of build parameters from a first end to a second end of the thickness of the overlap region and incrementally stepping up the second set of build parameters from the first end to the second end of the thickness of the overlap region.

7. The system of claim 1, wherein the model is decomposed into the submodels based at least in part on at least one of the subcomponents being designated for removal after the component is additively manufactured in the single build.

8. The system of claim 1, wherein the model is decomposed into the submodels based at least in part on a build speed customization associated with at least one of the subcomponents.

* * * * *